United States Patent
Lawser et al.

(10) Patent No.: US 10,171,676 B2
(45) Date of Patent: *Jan. 1, 2019

(54) METHOD FOR COMPLETING INTERNET TELEPHONY CALLS

(71) Applicant: AT&T Intellectual Property II, L.P., Atlanta, GA (US)

(72) Inventors: John Jutten Lawser, Holmdel, NJ (US); Larry Arnise Russell, Atlantic Highlands, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 85 days.

This patent is subject to a terminal disclaimer.

(21) Appl. No.: 15/431,357

(22) Filed: Feb. 13, 2017

(65) Prior Publication Data

US 2017/0163810 A1 Jun. 8, 2017

Related U.S. Application Data

(63) Continuation of application No. 13/975,776, filed on Aug. 26, 2013, now Pat. No. 9,571,327, which is a (Continued)

(51) Int. Cl.
| | |
|---|---|
| *H04M 3/42* | (2006.01) |
| *H04M 3/54* | (2006.01) |
| *H04L 12/64* | (2006.01) |
| *H04L 29/06* | (2006.01) |
| *H04L 29/08* | (2006.01) |
| *H04M 7/00* | (2006.01) |

(52) U.S. Cl.
CPC ........ *H04M 3/543* (2013.01); *H04L 12/6418* (2013.01); *H04L 29/06183* (2013.01); *H04L 67/24* (2013.01); *H04M 3/42374* (2013.01); *H04M 7/006* (2013.01); *H04M 7/0012* (2013.01); *H04L 2012/6443* (2013.01); *H04L 2012/6475* (2013.01); *H04M 2242/16* (2013.01)

(58) Field of Classification Search
CPC ............. H04M 3/543; H04M 3/42374; H04M 7/0012; H04M 7/006; H04M 2242/16; H04L 67/24
USPC ................ 379/211.02, 215.01; 370/352, 356
See application file for complete search history.

(56) References Cited

U.S. PATENT DOCUMENTS

| | | |
|---|---|---|
| 5,742,596 A | 4/1998 | Baratz et al. |
| 5,805,587 A | 9/1998 | Norris et al. |

(Continued)

OTHER PUBLICATIONS

U.S. Appl. No. 09/030,601, filed Feb. 25, 1998 (now U.S. Pat. No. 6,847,631).

(Continued)

*Primary Examiner* — Quynh Nguyen

(57) ABSTRACT

A call between a calling party and a called party, one or both of whom may be subscribers to Internet Telephony (IT) services, commences upon the receipt of a call dialed by the calling party to the Plain Old Telephony Service (POTS) number associated with the calling party. A first hub receives the call and routes it to the called party if that party is not an IT services subscriber that is currently on line. If the called party is an IT services subscriber that is on-line, the call is received at an Internet Services Provider serving the called party. The ISP converts the call to an IT format if the call is not already in that format and thereafter delivers the call to the called party.

20 Claims, 1 Drawing Sheet

Related U.S. Application Data continuation of application No. 12/506,803, filed on Jul. 21, 2009, now Pat. No. 8,520,665, which is a continuation of application No. 11/011,463, filed on Dec. 14, 2004, now Pat. No. 7,567,551, which is a continuation of application No. 09/030,601, filed on Feb. 25, 1998, now Pat. No. 6,847,631.

(56) References Cited

U.S. PATENT DOCUMENTS

| | | |
|---|---|---|
| 5,809,128 A | 9/1998 | McMullin |
| 5,838,682 A | 11/1998 | Dekelbaum |
| 5,870,465 A | 2/1999 | Hosbach et al. |
| 5,982,774 A | 11/1999 | Foladare et al. |
| 5,987,100 A | 11/1999 | Fortman et al. |
| 5,999,525 A | 12/1999 | Krishnamurthy et al. |
| 6,058,250 A | 5/2000 | Harwood et al. |
| 6,188,756 B1 | 2/2001 | Mashinsky |
| 6,219,413 B1 | 4/2001 | Burg |
| 6,304,566 B1 | 10/2001 | Schessel |
| 6,496,501 B1 | 12/2002 | Rochkind et al. |
| 6,847,631 B1 | 1/2005 | Lawser et al. |
| 7,567,551 B1 | 7/2009 | Lawser et al. |
| 8,520,665 B2 | 8/2013 | Lawser et al. |
| 2001/0055299 A1 | 12/2001 | Kelly |
| 2002/0085542 A1 | 7/2002 | Bedingfield et al. |
| 2003/0105874 A1 | 6/2003 | Schuster et al. |
| 2007/0019624 A1 | 1/2007 | Munson et al. |

OTHER PUBLICATIONS

U.S. Appl. No. 11/011,463, filed Dec. 14, 2004 (now U.S. Pat. No. 7,567,551).

U.S. Appl. No. 12/506,803, filed Jul. 21, 2009 (now U.S. Pat. No. 8,520,665).

U.S. Appl. No. 13/975,776, filed Aug. 26, 2013 (now U.S. Pat. No. 9,571,327).

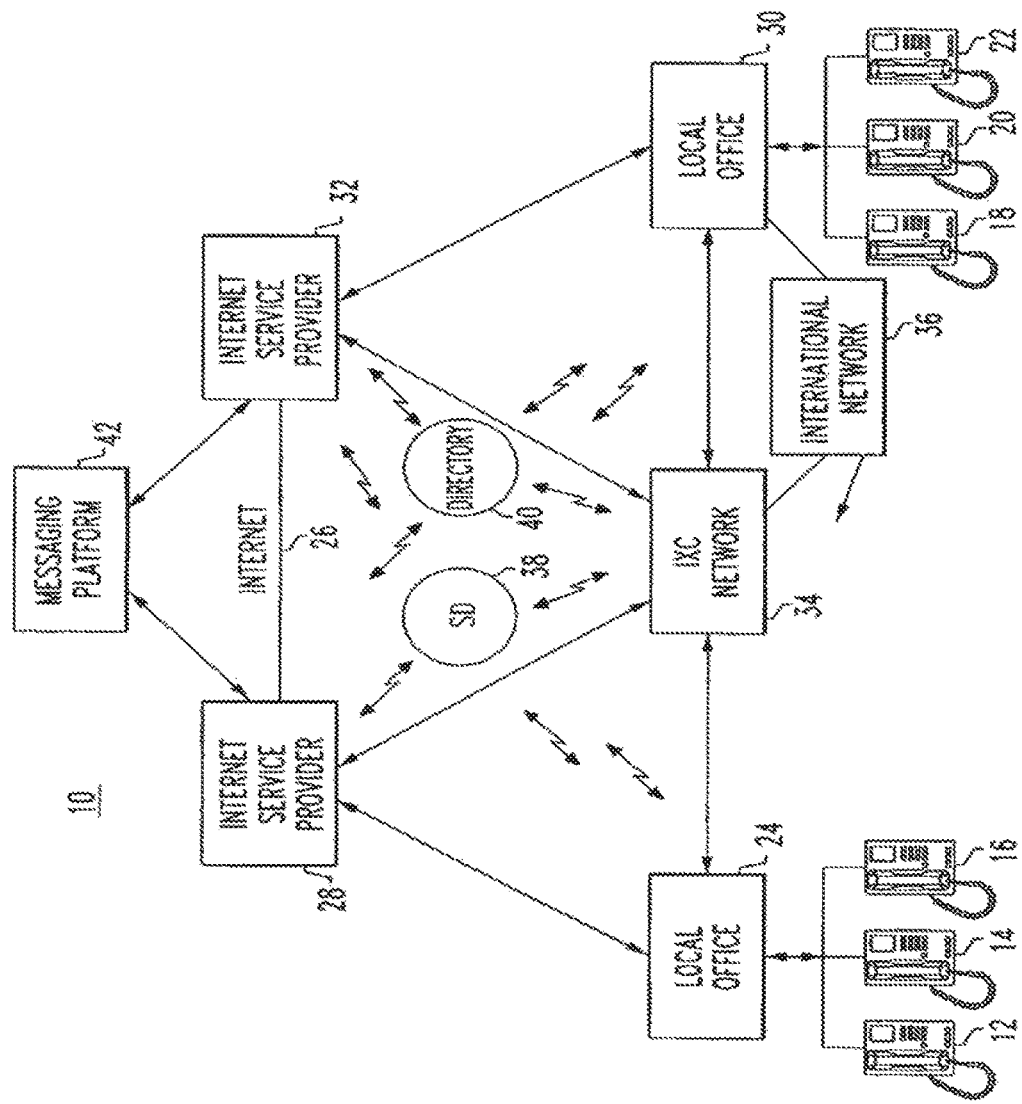

METHOD FOR COMPLETING INTERNET TELEPHONY CALLS

This application is a continuation of U.S. patent application Ser. No. 13/975,776, filed Aug. 26, 2013, now U.S. Pat. No. 9,571,327, and is a continuation of U.S. patent application Ser. No. 12/506,803, filed Jul. 21, 2009, now U.S. Pat. No. 8,520,665, and is a continuation of U.S. patent application Ser. No. 11/011,463, filed Dec. 14, 2004, now U.S. Pat. No. 7,567,551, and is a continuation of U.S. patent application Ser. No. 09/030,601, filed Feb. 25, 1998, now U.S. Pat. No. 6,847,631, all of which are herein incorporated by reference in their entirety.

TECHNICAL FIELD

This invention relates to a technique for efficiently completing a call from a calling party to a called party, one or both of who may subscribe to Internet Telephony services.

BACKGROUND ART

Telephony service over the Internet remains still remains in its infancy for a variety of reasons. One major impediment remains the problem of completing calls in an efficient and economical manner between calling and called parties, one or both of whom may be subscribers of Internet Telephony (IT) services. For example, the calling party will not know if the called party is on line. Indeed, the calling party may need to initially call the called party using the Public Switched Telephone Network (PSTN), such as PSTN maintained by AT&T, to request the called party go on line to complete an Internet Call. Most importantly, there is presently no way to automatically interlink between the PSTN and the Internet in an efficient manner. Instead, the caller must resort to trial and error. Also, there is presently no way to complete calls from a subscriber of Plain Ordinary Telephone Service (POTS) to an IT subscriber who is on-line.

Presently, a caller seeking to make a call over the Internet to a called party must also know the specific Internet Protocol (IP) address of the called party. Only by entering the particular IP address of the called party can the calling party launch an Internet telephone call. Not every calling party will remember the IP address for a particular called party. While there are services/servers that can do such mapping using an arbitrary text string, such as the caller's name, both the calling and called parties must subscribe to such service/servers and must utilize special software on their computers. Once the subscriber logs on, the software communicates the corresponding IP address to the server. In contrast, the calling party typically knows, or can easily retrieve the conventional seven or ten-digit Plain Old Telephony Service (POTS) number of the called party. However, to date, the called party's POTS number has played no role in IT.

Thus, there is a need for a technique for completing calls over the Internet in an economical, efficient manner, while taking advantage of the called party's conventional POTS telephone number.

BRIEF SUMMARY OF THE INVENTION

Briefly, the present invention provides a technique for completing a call between calling and called parties, one or both of whom may be IT subscribers. The method commences upon receipt of a call from the calling party dialed to the POTS number of the called party. A first hub, such as a local office in the event the calling party is a POTS subscriber, or an Internet Service Provider (ISP), in the event the calling party is an IT subscriber, receives and routes the call to the called party if the called party is not an IT services subscriber and is not on line. If the called party is an IT services subscriber and is on-line, the first hub offers the call to Internet Services Provider (ISP) serving the called party, as determined by the called party's POTS number. The ISP serving the call party converts the call to an IT format if the call is not presently in such a format and then delivers the call to the called party.

BRIEF DESCRIPTION OF THE DRAWING

FIG. 1 illustrates a block schematic diagram of a network, in accordance with the invention, for completing IT calls in accordance with the present invention.

DETAILED DESCRIPTION

FIG. 1 depicts a network 10 for completing calls from one or more originating communications devices 12, 14, and 16 to one or more recipient communications devices 18, 20, and 22 in accordance with the invention. In the illustrated embodiment, the communications devices 12-20 may each take the form of a voice station set or a multi-media terminal, in the form of a computer or the like, each capable of dialing the POTS number of the called party irrespective of whether that party is a subscriber of IT services. Each of the originating communication devices 12, 14, and 16 receives local telephone service (i.e., dial tone) via a first local telephone switch within a first local office 24 maintained by a first local exchange carrier. Those of the originating communication devices 12, 14, and 16 that are multi-media terminals typically gain access to the Internet 26 through a first Internet Service Provider (ISP) 28, such as AT&T Worldnet Services, via a dial-up link through the first local office 24. (Under some circumstances, one or more of communications devices 12, 14, and 16 that are multi-media terminals could directly connect with the ISP 28 rather than gain dial-up access through the first local office 24.)

The recipient communications 18, 20, and 22 receive local telephone service (i.e., dial tone) via a local switch at a second local office 30. Those of the originating communication devices 18, 20 and 22 that are multi-media terminals typically gain access to the Internet 26 through a second Internet Service Provider (ISP) 32 via a dial-up link through the second local office 30. (Under some circumstances, one or more of the communications devices 18, 20, and 22 that are multi-media terminals could directly connect with the ISP 28 rather than gain dial-up access through the second local office 30.) While FIG. 1 depicts separate ISPs 28 and 32 for providing Internet access to those of the communication devices 12, 14, and 16, and 18, 20, and 22, respectively, that are multi-media terminals, a single ISP could provide such access, depending on the geographic proximity of such multi-media terminals.

In the exemplary embodiment, the second local office 30 resides in a Local Access Transport Area (LATA) different from the LATA of the first office 24. Since the local offices 24 and 30 lie in different LATAs, an Inter-Exchange (IXC) network 34, such as the inter-exchange network maintained by AT&T, provides inter-exchange service for carrying calls originating at the local office 24 in the first LATA that are destined for the second office 30 in the second LATA. Instead of residing in a second LATA, the local office 30 could reside in a foreign country. Under such circumstances, the local office 24 would route the call to the IXC network 34 for routing to an international network 36, that would route the call to the local office 30. For a foreign local office 30, the international network 36, rather than the IXC network 34, could be linked to the ISP 32 that serves one or more of the communications devices 18-22, assuming that the ISP 32 were located overseas.

To best appreciate the manner in which the network 10 completes calls from a calling party to a calling party, one or both of whom may be subscribers to IT service, there are four possible scenarios:

1. An originating POTS call dialed to a POTS number of the called party who is a subscriber of IT services but is "off line";
2. An originating POTS call dialed to the POTS number of an IT services subscriber that is "on line";
3. An originating call from an IT services subscriber dialed to the POTS number of a subscriber that does not subscribe to IT services; and
4. An originating call from an IT subscriber dialed to the POTS number of an IT subscriber that is "on line".

Scenario 1 Originating POTS Call to an IT Subscriber that is Off Line

A non-IT services subscriber, using one of the communication devices 12, 14, and 16, originates a POTS call to the called party by dialing that party's POTS number. (For purposes of discussion, whether the call is an inter-exchange or local call does not matter.) The local office 24 receives the call and from the dialed number, the local office determines whether the call is local or an inter-exchange call. If the call is local, the local office 24 accesses a dialed number database 38, such as a Segmentation Directory (SD). For a more complete understanding of the nature of the SD, reference should be had to U.S. Pat. No. 5,473,677, issued on Dec. 5, 1995, in the name of Peter D'Amato et al. and assigned to AT&T. (herein incorporated by reference). The SD 38 contains a record for each dialed number indicating whether the call requires special processing, and if so, the identity of the directory containing the instructions for processing the call. If the SD 38 determines that the call requires no special processing, the SD informs the local office 24 accordingly, and the local office treats the call as an ordinary POTS call for routing within its LATA.

Should the local office 24 determine that the received call is a long distance call, the local office routes the call to the IXC network 34. Upon receipt of the call, the IXC network 34 launches an inquiry to the SD 38. If the SD 38 determines that the call requires no special processing, the SD informs to the IXC network 34, which then routes the call to the local office, say, local office 30, serving the called party.

If the SD 38 determines the dialed number requires special processing, then the SD launches an inquiry to the directory that contains the necessary call processing instructions. For example, when the SD 38 determines that the dialed number recipient subscribes to IT services, as indicated by a cross-reference to a directory (i.e., directory 40) associated with such services, the SD launches an inquiry to that directory. The directory 40 responds with the necessary call processing instructions to either to the local office 24 or to the IXC network 34, depending on which one made the initial inquiry to the SD 38.

The call processing instructions supplied by the directory 40 include the identity of the ISP serving the called party (e.g., ISP 32). Upon receipt of the identity of the called party's ISP, the local office 24 (or the IXC network 34, for an inter-exchange call) launches an inquiry, typically via an SS7 signaling link (not shown), to the called party's ISP 32 to determine whether the called party is presently on-line. If the called party is on line, then the local office 24 (or the IXC network 34 if the call is long distance) offers (transfers) the call, either by direct routing, or via a signaling message, to the called-party's ISP 32 for conversion to an IT call for receipt by the called party. If the called party is not on line, then the ISP 32 "cranks back" the call to the local office 24 (or the IXC network 34) which then routes the call to the called party via the called party's local office 30.

Rather than utilize the local office 24 (or IXC 34) to launch an inquiry to SD 38, the local office or IXC network could simply route the call to the called party's POTS number through the called party's local office 30 irrespective of whether the called party is an IT services subscriber or not. In other words, the local office 24 (or the IXC network 34) need not initially establish whether or not the called party subscribes to IT services in advance of routing the call to the called party. However, to facilitate IT services in accordance with the invention without prior knowledge of the called party's service status, the called party must subscribe to "Remote Call Forwarding on Busy", whereby a call dialed to the called party's POTS number forwards automatically to that party's ISP 32. Most local telephone service providers offer this service as an option. When the called party is not busy and is available to answer the phone, the called party will presumably answer the call dialed to that party's POTS number, as routed through the called party's local office 30. Hence, the call initiated by the calling party proceeds in the conventional manner as a POTS call for receipt at the called party's local office 30.

However, when the called party is busy, the called party's local office 30 now automatically routes the call to the called party's ISP 32 that then checks whether the called party is currently on-line. If so, the called party's ISP 32 converts the POTS call to an IT call and then delivers it to the called party's multi-media terminal. If the called party is not on line, but is otherwise busy, the ISP 32 may respond with a busy signal. Alternatively, if the called party so desires, the ISP 32 may forward the call to a messaging platform 42 to allow the calling party to leave a message. Additionally, the subscriber could also subscribe to "Remote Call Forwarding on No-Answer" so that upon a no-answer condition, the called party's local office 30 forwards the call to the called party's ISP 32, which, then checks whether the called party is on-line. Since the called party isn't on-line, the called party's ISP 32 forwards the call to the messaging platform 42. In practice, the called party can access the messages stored by the messaging platform 42, either via the Internet 26, or if the platform has dial-up access, via a conventional POTS call.

Scenario 2 Originating POTS Call to an On-Line IT Services Subscriber.

Assume the calling party initiates a POTS call to a called party who subscribes to IT services, but is now on-line. Under such circumstances, call processing initially proceeds as previously described with Scenario 1. In other words, the local office 24 (or the IXC 34 for an inter-exchange call) receives the POTS call and thereafter launches an inquiry to the SD 38. If the SD 38 determines the dialed number corresponds to a called party that subscribes to IT services, the SD launches an inquiry to the directory 40. In response, the directory 40 responds by providing the identity of the called party's ISP 32 in accordance with the called party's POTS number dialed by the calling party. Upon receipt of the called party's ISP identity, the local office 24 (or the IXC 34) launches an inquiry to the called party's ISP 32 to determine if the called party is on line. If so, the local office 24 (or IXC network 32) offers the call to the called party's ISP 32 that converts the call to an IT call for delivery to the called party.

Alternatively, rather than launch an inquiry to the SD 38, the local office 24 (or the IXC network 32) could simply route the call to the called party's local office 30 irrespective of the called party's status. As discussed, under such circumstances, the called party must subscribe to Remote Call Forwarding on Busy. Assuming that the called party is busy because that party is on line, the called party's local office 30 forwards call to the called party's ISP 32. Upon receipt of the call, the ISP 32 checks its record of logged-on subscribers. Assuming the called party is on line, the ISP 32 confirms the called party's status and then converts the received call to an IT call for delivery to the called party. In delivering the IT call to the called party, the ISP 32 may provide an alert on the called party's multi-media terminal, either in the form of a visual or audible message or both. After delivery of the call, the calling and call parties can converse using standard Internet Protocols. Note that if the called party does not answer, the ISP 32 can forward the call to the message platform 42 as discussed for subsequent retrieval.

As discussed with respect to Scenario 1, if the calling and called parties reside in different LATAs, the local office 24 initially receiving the call thereafter routes it to the IXC network 34. In turn, the IXC network 34 will route the call to the called party's local office 30 for subsequent forwarding to the called party's ISP 32. Under such circumstances, the IXC network 34 will incur an access fee charged by the called party's local office 30. Rather than incur such an access fee, the IXC network 34 could forward the call directly to the called party's ISP 32 in the manner described earlier, by accessing the SD 38 which, in turn, would access the directory 40. In response to the inquiry from the SD 38, the directory 40 responds to the IXC network 34 with the identity of the called party's ISP 32, as determined from the called party's POTS number dialed by the calling party. Knowing the identity of the called party's ISP 32, the IXC network could forward the call to the ISP directly, rather than to the called party's local office 30, thus incurring no access charge for egress.

Scenario 3 Originating Internet Call to Terminating POTS Subscriber

Under this scenario, an IT services subscriber initiates a call, via one of the communications devices 12, 14, and 16 comprising a multi-media terminal, to a POTS subscriber. The calling party initiates such a call by dialing the called party's POTS number. Since calling party is currently on-line, the calling party's ISP 28 receives the call. In response, the ISP 28 checks its records to determine if the called party is an IT subscriber and is served by the ISP. Since the called party is a POTS subscriber, the ISP 28 will not find the called party among its IT subscribers. Under such circumstances, the ISP 28 converts the call to a POTS call and forwards the call to either to the local office 24 or to the IXC network 34. (By forwarding the call to the IXC network 34, the ISP 28 avoids originating access charges.) Upon receipt of the call, the local office 24 (or the IXC 34) routes the call as an ordinary POTS call to the called party's local office 30 for delivery to the called party in a convention manner as is known.

Scenario 4 Originating Internet to Terminating Internet (Called Party is On Line)

Under this scenario, the calling party initiates an IT call from his/her multi-media terminal by dialing the POTS number of the called party. The calling party need not know whether the called party is on line. Upon receipt of the call, the calling party's ISP 28 checks its database to determine if the called party is among the IT services subscribers served by that ISP. If so, the ISP 28 forwards the call as an IT call in a known manner. If the calling party's ISP 28 determines that the called party is not among the IT services subscribers it serves, the ISP converts the call to a POTS call and forwards it to the local office 24 (or the IXC network 34 to avoid access charges.)

Upon receipt of the call, the local office 24 (or the IXC 34) follows the process described previously whereby the local office or IXC network consults the SD 38, which, in turn, queries the directory 40. In response, the directory 40 provides call processing instructions that include the identity of the called party's ISP 32. The local office 24 (or the IXC network 34) then transfers the call to the called party's ISP 32, either via a signaling inquiry or by directly routing the call. Upon receiving the call, the called party's ISP 32 checks its database of on-line subscribers. If the called party is on-line, the ISP 32 converts the call to an Internet call and routes it to the called party.

Rather than route the call to either the local office 24 (or the IXC network 34), the calling party's ISP 28 could route the call over the Internet 26 directly to the called party's ISP 32. First, the ISP 28 would check its records of on-line subscribers as previously described. If the called party is not among the list of on-line subscribers, the calling party's ISP 28 launches an inquiry to the SD directory 38 in exactly the same manner as discussed for the local office 24 and IXC network 34. In response the SD 38 queries the directory 40 which then responds to the ISP 28 with the identity of the called party's ISP 32. The calling party's ISP 28 then signals the called party's ISP 32 to determine whether the called party is on line. If so, then the call proceeds as an IT call and is completed accordingly. Otherwise, the calling party's ISP 28 routes the call to the IXC network 34 for completion in the manner discussed previously in Scenario 3.

To process IT calls in the manner discussed above, the calling and called party's ISPs 28 and 32, respectively, each must possess an adjunct capable of converting conventional POTS to calls IT calls and vice versa. Such adjuncts exist. An example of such an adjunct is the adjunct used by AT&T for Internet Enhanced Telephony Services. Also, the originating local office and the IXC network 34 (as well as the originating ISP) must have access to a dialed number database, such as the SD 38 capable of accessing the directory 40 containing IT services call processing information. The directory 40 could easily comprise a conventional 2NCP directory presently existing in AT&T's IXC network. Lastly Remote Call Forwarding is a well known service available from most local service providers.

The foregoing describes a technique for efficient and economically completing IT calls between called and called parties, one or both of who may be IT services subscribers.

The above-described embodiments are merely illustrative of the principles of the invention. Those skilled in the art may make various modifications and changes that will embody the principles of the invention and fall within the spirit and scope thereof.

The invention claimed is:
1. A method for completing an originating call to a plain old telephony service number associated with a called party, the method comprising:
   receiving, by an internet service provider, the originating call dialed to the plain old telephony service number associated with the called party in a telecommunica- tions network, wherein the originating call is a plain ordinary telephone service call;

determining, by the internet service provider, whether the called party is an internet telephony service subscriber and is on-line;

forwarding, by the internet service provider, the originating call to the called party when the called party is an internet telephony service subscriber and is on-line; and forwarding, by the internet service provider, the originating call to a messaging platform when the called party is off-line.

2. The method of claim 1, wherein the originating call is received from a local office serving a calling party.

3. The method of claim 1, wherein the forwarding the originating call to the called party comprises:

converting the originating call to an internet telephony format when the originating call is not presently in the internet telephony format.

4. The method of claim 1, wherein the originating call comprises an inter-exchange call and is routed through an inter-exchange network.

5. The method of claim 4, wherein the forwarding the originating call to the called party comprises routing the originating call to another internet service provider serving the called party via the inter-exchange network to avoid an access charge.

6. The method of claim 1, further comprising:

routing the originating call to an inter-exchange network; and launching an inquiry to a dialed number database from an inter-exchange carrier associated with the inter-exchange network.

7. The method of claim 1, wherein the originating call is received from another internet service provider serving a calling party when the calling party is an internet telephony service subscriber.

8. The method of claim 7, wherein the another internet service provider serving the calling party routes the originating call to the internet service provider.

9. The method of claim 8, wherein the another internet service provider serving the calling party consults a dialed number database to determine the identity of the internet service provider.

10. The method of claim 8, wherein the another internet service provider serving the calling party launches a signaling inquiry to the internet service provider to determine whether the called party is on-line.

11. A system for completing an originating call to a plain old telephony service number associated with a called party, the system comprising:

a hub of an internet service provider, for receiving the originating call dialed to the plain old telephony service number associated with the called party in a telecommunications network, wherein the originating call is a plain ordinary telephone service call, for determining whether the called party is an internet telephony service subscriber and is on-line, for forwarding the originating call to the called party when the called party is an Internet telephony service subscriber and is on-line, and for forwarding the originating call to a messaging platform when the called party is off-line.

12. The system of claim 11, wherein the originating call is received from a local office serving a calling party.

13. The system of claim 11, wherein the forwarding the originating call to the called party comprises:

converting the originating call to an internet telephony format when the originating call is not presently in the internet telephony format.

14. The system of claim 11, wherein the originating call comprises an inter-exchange call and is routed through an inter-exchange network.

15. The system of claim 14, wherein the forwarding the originating call to the called party comprises routing the originating call to another internet service provider serving the called party via the inter-exchange network to avoid an access charge.

16. The system of claim 11, further comprising:

routing the originating call to an inter-exchange network; and launching an inquiry to a dialed number database from an inter-exchange carrier associated with the inter-exchange network.

17. The system of claim 11, wherein the originating call is received from another internet service provider serving a calling party when the calling party is an internet telephony service subscriber.

18. The system of claim 17, wherein the another internet service provider serving the calling party routes the originating call to the internet service provider.

19. The system of claim 18, wherein the another internet service provider serving the calling party consults a dialed number database to determine the identity of the internet service provider.

20. The system of claim 18, wherein the another internet service provider serving the calling party launches a signaling inquiry to the internet service provider to determine whether the called party is on-line.

* * * * *